Oct. 6, 1953  H. S. VAN BUREN, JR  2,654,133
REMOVABLE BUTTON DEVICE AND INSTALLATION THEREOF
Filed Sept. 2, 1948  2 Sheets-Sheet 1

INVENTOR:
HAROLD S. VAN BUREN, JR.
BY Walter S. Jones
ATTORNEY.

Oct. 6, 1953     H. S. VAN BUREN, JR     2,654,133
REMOVABLE BUTTON DEVICE AND INSTALLATION THEREOF
Filed Sept. 2, 1948     2 Sheets-Sheet 2
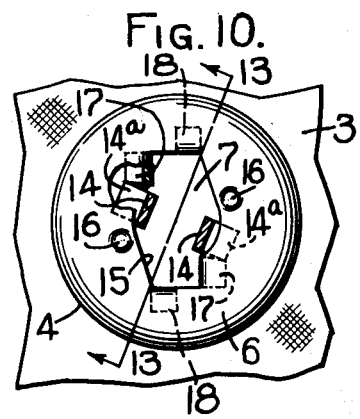
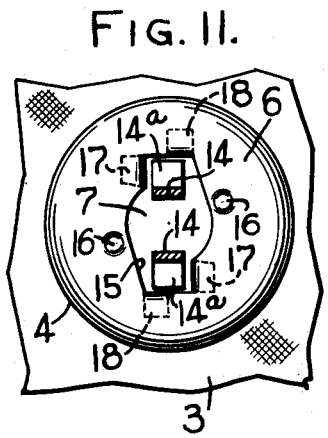
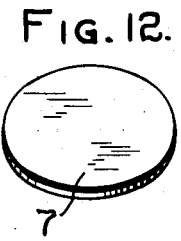
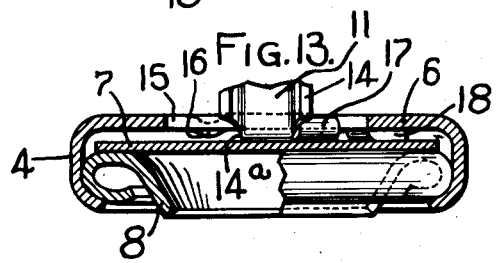
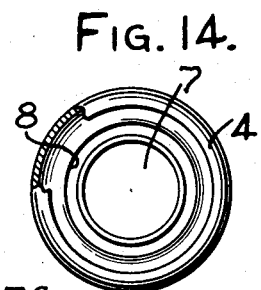
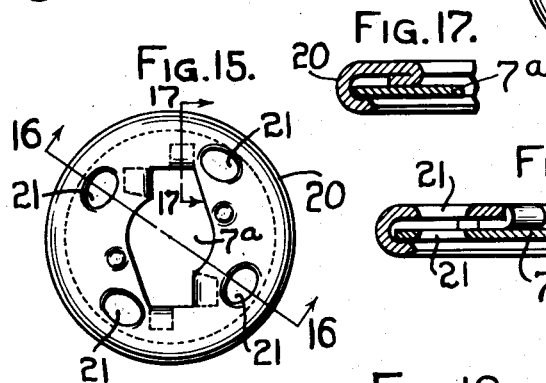
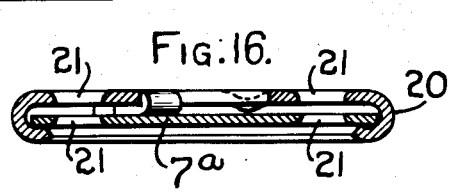
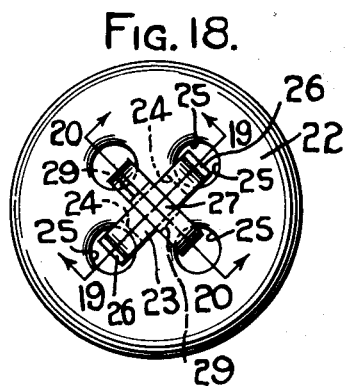
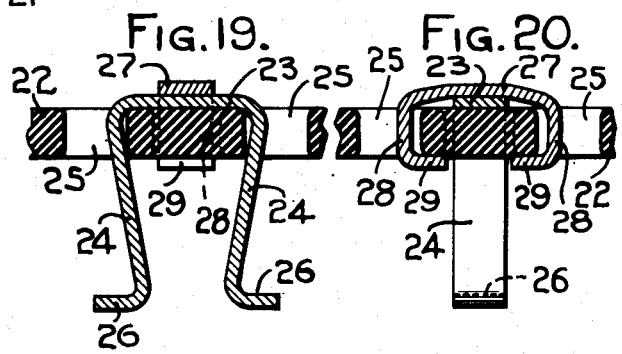
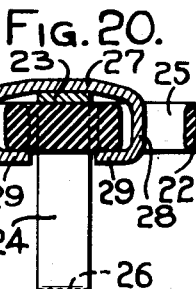
INVENTOR:
HAROLD S. VAN BUREN, JR.
BY
ATTORNEY.

Patented Oct. 6, 1953

2,654,133

UNITED STATES PATENT OFFICE 2,654,133

REMOVABLE BUTTON DEVICE AND INSTALLATION THEREOF

Harold S. van Buren, Jr., Cambridge, Mass., assignor to United-Carr Fastener Corporation, Cambridge, Mass., a corporation of Massachusetts Application September 2, 1948, Serial No. 47,432

13 Claims. (Cl. 24—109)

My invention aims to provide improvements in removable buttons for closures. The buttons are easily and quickly attachable and detachable and are particularly useful when such buttons are not of a construction that permits laundering or cleansing. They are also useful when it is desirable to change the buttons for others for reason of color or design.

An object of the invention is to provide a button that may be applied either by the manufacturer or a purchaser of an article.

Another object of the invention is to permit application of the device either by known hand A further object of my invention is to permit the refitting of a garment having sewn buttons with my improved removable devices.

Referring now to those forms of my invention illustrated by the accompanying drawings:

Fig. 10 is a reduced section taken on the line 10—10 of Fig. 3;

Fig. 11 is a section similar to Fig. 10 but showing the sectional part of the button turned to removable portion;

Fig. 12 is a perspective view of the supporting disc of the button holding part;

Fig. 13 is an enlarged section taken on the line 13—13 of Fig. 10, the carrying material and pronged attaching ring being omitted;

Fig. 14 is a bottom (part sectional) view of the button holding part shown in Fig. 13;

Fig. 15 is a plan view of a modified construction for a removable button holding part;

Fig. 16 is a section taken on the line 16—16 of Fig. 15 crosswise the elongated plate portion;

Fig. 17 is a section on the line 17—17 of Fig. 15 lengthwise the elongated plate portion;

Fig. 18 is a plan view of a modified construction for a removable button;

Fig. 19 is an enlarged partial section taken on the line 19—19 of Fig. 18; and

Fig. 20 is an enlarged partial section taken on the line 20—20 of Fig. 18.

Figure 1:
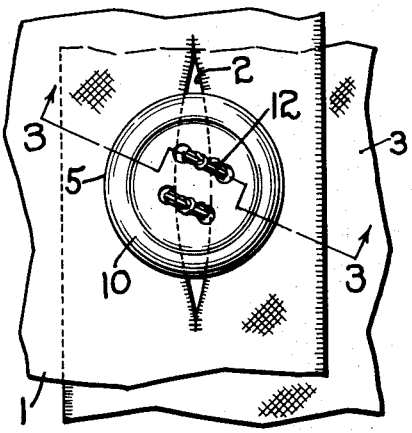
Fig. 1 is a front view of a portion of an installation showing one form of my removable button.
Figure 2:
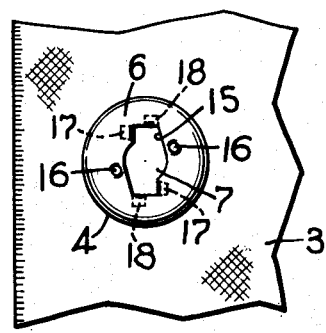
Fig. 2 is a front view of the under part of the garment, or the like, showing a device that holds the removable button.

In my copending application Serial No. 47,431, filed September 2, 1948, I have described and claimed a button device involving a removable part and an attaching member. The button devices of this application are adapted for use with structure claimed and described in such copending application.

Referring now to the disclosure of my invention as shown in Figs. 1 through 14 of the drawings there is illustrated a removable button device for use with articles of manufacture requiring a button and button hole type of closure. Only a portion of the closure is illustrated and it includes a portion 1 having a button hole 2, and a portion 3 carrying the button holding device 4 and the removable button 5.

Figure 3:
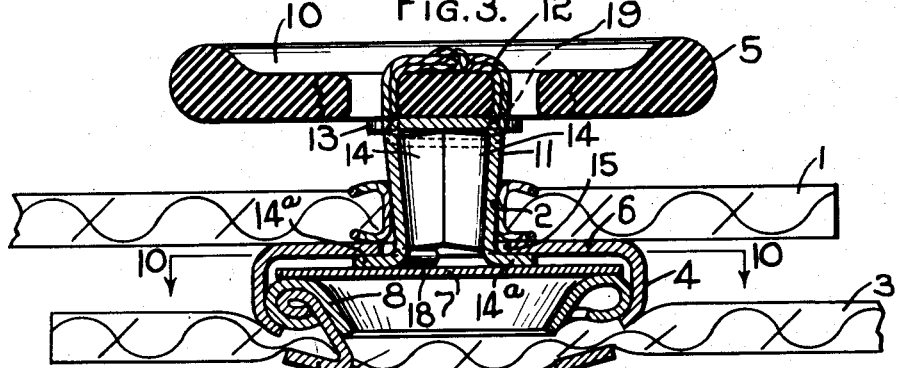
Fig. 3 is an enlarged section of the installation taken on the line 3—3 of Fig. 1.

The button holding device 4 comprises a casing or face plate 6 with which is assembled a disc or back plate 7 and an anvil member 8, as shown in Figs. 3 and 13. This device 4 is attached to the carrying portion 3 by a pronged attaching part 9 (Figs 3 and 9) and the assembly may be made with an automatic attaching machine, hand tools for attaching snap fasteners or by a hammer.

Figure 4:
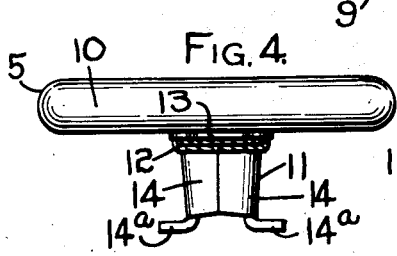
Fig. 4 is a side elevation of one form of my improved removable button.
Figure 6:
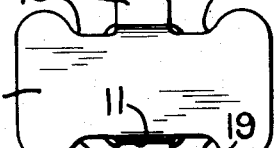
Fig. 6 is a plan view of a button shank forming a unit of my invention.
Figure 8:
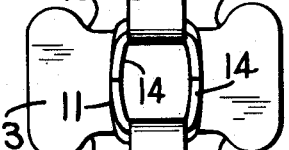
Fig. 8 is a bottom view of the button shank shown in Figs. 6 and 7.
Figure 5:
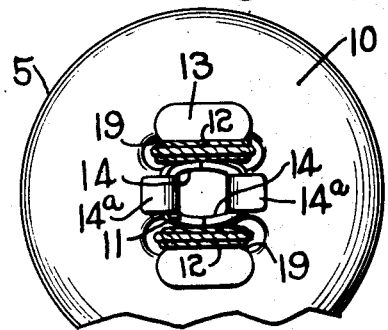
Fig. 5 is a bottom view of the button shown in Fig. 4.
Figure 7:
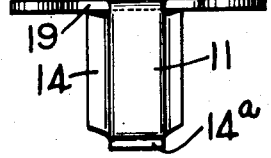
Fig. 7 is a side view of the shank shown in Fig. 6.
Figure 9:
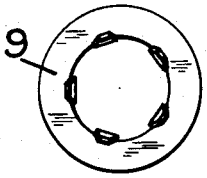
Fig. 9 is a plan view of a pronged attaching element of the button holding part.

My improved removable button 5, as shown, includes a sew-on button 10 of any shape or construction, and a shank member 11 of special design and hereafter more fully described. The two parts are preferably assembled by a sewing thread 12, as shown in Figs. 3, 4, and 5.

The shank member 11 is formed from a single piece of metal stamped and folded (Figs. 6, 7, and 8) to provide a top flange 13, two shank halves 14—14 and tongues 14a—14a extending from the shank halves. These tongues are adapted to enter an aperture 15 in the face of the casing 6 (Fig. 11) and be rotated under bumps 16—16 against the disc 7 and stop in contact with stop members 17—17 (Fig. 10). Thus the removable button is held in attached position and is prevented from accidental rotation by the bumps 16—16. When forced under the bump 16—16 the casing 6 and the disk 7 may yield in a sort of spring action. The tabs 18—18 (Figs. 13 and 14) are provided between the casing 6 and the button 10 which when in the position shown prevent any gagement and disengagement of the removable tongues 14a—14a.

A description of the advantages of my improved device will serve to enable those skilled in the art to understand the importance and the simplicity. Since the shank member may be sold as a unit it will be understood that the purchaser may attach to that unit any suitable button having holes. The flange 13 is so designed that sewing threads may pass through the holes (any number) in the button and around and in the notches 19. It will also appear that the button holding member may be attached easily by hand tools or a hammer since it is easy to force the prongs of the pronged ring 9 through the cloth, paper, leather, or the like, and into the anvil member 8. Thus my improved devices may be attached by the home dress maker to new or old button hole garments with ease. The advantages are of course apparent since the buttons may be easily replaced for laundering or cleansing purposes or for changing design or color.

It should be understood that my invention also lends itself to garment and like manufacturers since it provides a more useful garment and the button holding parts may be attached easily by automatic machines. It also helps the sale of garments because several styles and colors of buttons may be sold with the original garment. The buttons may be in the form of caps, in fancy colors and designs, attached to the flanges of the button shanks.

Referring now to the modified form of my invention shown in Figs. 15, 16, and 17, I have shown a button holding part 20 that is designed to be sewn to the supporting material. This part is the same as the device 4 except that the anvil 8 is omitted and sewing holes 21 are provided. The holes 21 pass through both the casing and the disc 7a so that the part may be easily applied to a garment or other article by threads as in the manner of attaching a button.

In Figs. 18, 19, and 20 I have shown a removable button assembly comprising a button 22, a shank formed from a narrow piece of metal and having a button engaging portion 23, legs 24—24 passing through holes 25—25 (Fig. 19) in the button and tongues 26—26 for engagement with a part 4 or 20. A clip 27 is assembled to the button (Fig. 20) and overlies the portion 23 of the shank to hold it in place by means of legs 28—28, passing through other holes 25—25, and having their ends 29—29 clamped against the underside of the button.

My improved devices are simple in construction, they are easy to attach and they operate very readily. It will be apparent that the button members or caps may be metal, plastic, wood, or any other material and their design may be anything desirable. Once the buttons are installed they may be easily and quickly removed and replaced or substitutions made by simple rotary action. Furthermore the button holding parts will withstand normal dry cleansing and laundering processes because they are constructed with this in mind.

My invention has been illustrated and described in several forms but is best defined by the following claims.

I claim:

1. A removable button for quick attachment to and detachment from a button holding member comprising a button head, a shank member, and means for securing said button head to said shank member, said button head having a plurality of apertures extending therethrough for cooperation with said securing means, said shank member being made from sheet material and comprising a body portion in secured engagement to said button head, a shank portion having opposed rigid leg elements extending normal to said body portion, and tongue means on the end of said shank portion opposite said body portion for insertion into and engagement with a button holding member, said securing means having elements extending through apertures of said button head and passed around a part of said body portion securing said button head to said body portion.

2. A removable button in accordance with claim 1 wherein the body portion of the shank member comprises an elongated flat plate member in engagement with one face of the button with the leg elements of the shank portion extending from the side edges thereof and the securing means elements encircling the elongated plate adjacent opposite side edges of the leg elements, extending through adjacent apertures of button head and securely binding said button head to said body portion.

3. A removable button in accordance with claim 1 wherein the shank comprises an elongated strip of sheet material in U-shape with the bight forming the body portion in engagement with a face of the button head and the leg elements extending through apertures in the button and elements of the securing means extending through other apertures in the button head encircling said bight portion and a portion of said button head.

4. A removable button installation for clothing and like closures, said installation comprising in combination a button member, a button mounting shank member for extending through an aperture of a portion of an article of clothing or the like on one side of a closure in such article, means for securing said button member to said shank member, and a button mounting device for mounting on another portion of such an article on the other side of the closure, said button member having a plurality of apertures extending therethrough, said shank member including a central body portion and opposed rigid leg elements extending substantially parallel leg elements extending substantially normal to said body portion from opposite side edges thereof and laterally projecting tongues extending from the free ends of said leg elements, said securing means including elements extending through apertures of said button members and embracing a part of said shank member, and said button mounting device being a hollow device having spaced top and bottom relatively yieldable faces providing inner opposed surfaces for slidably engaging said tongues, said top face being apertured for receiving the end of said shank member and said tongues in one position, said inner surfaces of said device presenting therebetween tongue-engaging bumps and stops to prevent accidental displacement when said button is in attached position.

5. A removable button installation for clothing and like closures in accordance with claim 4 wherein the central body portion of the shank member comprises an elongated flat plate portion from the side edges of which intermediate the ends thereof the leg elements extend and the elements of the securing means encompass crosswise the elongated plate portion adjacent opposite side edges of the leg elements.

6. A removable button installation for clothing and like closures in accordance with claim 4 wherein the central body portion of the shank member comprises an elongated strip portion from the ends of which extend the leg elements, which extend through apertures of the button member, and the securing means elements extend through other apertures of the button member and opposite faces of said central body portion and said button member.

7. An attaching member for securing a removable button device to clothing and the like, said member comprising a face plate, a back plate, and an anvil member, said anvil member having curled-over portions around the periphery providing an inwardly directed peripheral recess and sloping portions adjacent the curled-over portions providing camming surfaces leading into said recess to direct into secured engagement within said recess the prongs of a pronged attaching element which may be forced through a sheet material support against said camming surfaces, said face plate having a peripheral flange securing said back plate and said anvil member in assembly therewith, said face plate having a noncircular aperture for receiving in one position a shank of a removable button device having opposed laterally extending tongues and permitting relative rotation of said shank with respect thereto with the tongues passing between said face and back plates, said plates having spacing means disposed to maintain the spacing therebetween and stop elements disposed therebetween to limit relative rotation of the button device shank and tongues relative thereto, one of said plates having retaining means extending toward the other and circumferentially spaced from said stop elements, said retaining means providing camming surfaces permitting although resisting the passage of said tongues thereby, said plates being relatively yieldable with respect to each other to permit said tongues to be received and releasably secured between said retaining means and said stop elements.

8. A removable button assembly for clothing and the like, said assembly comprising: an attaching member, a shank member, and a button member secured to said shank member; said shank member including a central body portion for attachment to said button member, opposing leg portions extending normal to said body portion on opposite edges thereof to provide the shank body, and tongues at the free ends of said leg portions extending substantially normal thereto in opposite directions; and said attaching member including a face plate, a back plate, and an anvil member, said anvil member having curled-over portions around the periphery providing an inwardly direct peripheral recess and sloping portions adjacent the curled-over portions providing camming surfaces leading into said recess to direct into secured engagement with said recess the prongs of a pronged attaching element which may be forced through a sheet material support against said camming surfaces, said face plate having a peripheral flange securing said back plate and said anvil member in assembly therewith, said face plate having a noncircular aperture for receiving in one position the tongues of said shank member and permitting relative rotation of said shank with respect thereto with the tongues passing between said face and back plates, said plates having spacing means disposed to maintain the spacing therebetween and stop elements disposed therebetween to limit positively the relative rotation of the button member and said attaching member, one of said plates having retaining means extending toward the other and circumferentially spaced from said stop elements, said retaining means providing camming surfaces permitting although resisting the passage of the tongues thereby, said plates being relatively yieldable with respect to each other to permit said tongues to be received and releasably secured between said retaining means and said stop elements.

9. A button assembly in accordance with claim 8 wherein the shank member includes opposed semi-cylindrical leg portions, the free edges of said leg portions abutting to provide a rigid hollow shank.

10. A button assembly in accordance with claim 8 wherein the button member has a plurality of apertures and the assembly includes securing means having elements extending through said apertures around a part of said body portion securing said button member to said shank member.

11. A button assembly in accordance with claim 8 wherein the button member has a plurality of apertures and wherein the central body portion of the shank member is secured to one face of the button member and the leg portions extend through certain of said apertures to provide the shank body extending from an opposite face of said button member.

12. A button assembly in accordance with claim 11 including securing means having elements through certain other apertures of the button member around the central body portion of the shank member securing the button member to said shank member.

13. A button shank for removably mounting a removable button on a button holding member, said shank being made of sheet material and comprising a central body portion for attachment to a removable button, opposed channel shaped leg portions extending from said body portion on opposite sides thereof, and in a direction normal thereto, the free edges of the channel shaped leg portions being disposed in abutting relation to provide a tubular shank body, and a tongue at the free end of one of said leg portions extending substantially normal thereto for quick attachment to and detachment from a button holding member.

HAROLD S. van BUREN, Jr.

References Cited in the file of this patent

UNITED STATES PATENTS

| Number | Name | Date |
| --- | --- | --- |
| 138,107 | Washbourne | Apr. 22, 1873 |
| 245,320 | Rowe | Aug. 9, 1881 |
| 960,780 | Bate | June 7, 1910 |
| 1,340,390 | Glynn | May 18, 1920 |
| 1,523,009 | Folkman | Jan. 13, 1925 |
| 1,912,100 | Rosenberg | May 30, 1933 |
| 2,110,645 | Carley | Mar. 8, 1938 |
| 2,256,849 | Purinton | Sept. 23, 1941 |
| 2,451,077 | Emsig | Oct. 12, 1948 |
| 2,471,589 | Shaffer | May 31, 1949 |
| 2,484,654 | Shaffer | Oct. 11, 1949 |